United States Patent
Takewa et al.

[11] Patent Number: 6,092,183
[45] Date of Patent: Jul. 18, 2000

[54] DATA PROCESSOR FOR PROCESSING A COMPLEX INSTRUCTION BY DIVIDING IT INTO EXECUTING UNITS

[75] Inventors: Hidehito Takewa; Shigeru Matsuo, both of Hitachi; Shinji Fujiwara, Yokohama; Masahisa Narita, Hitachi, all of Japan

[73] Assignee: Hitachi, Ltd., Tokyo, Japan

[21] Appl. No.: 08/401,691

[22] Filed: Mar. 10, 1995

[30] Foreign Application Priority Data

Mar. 16, 1994 [JP] Japan .................................. 6-045365

[51] Int. Cl.$^7$ ...................................... G06F 9/30
[52] U.S. Cl. ..................... 712/215; 712/200; 712/204; 712/206; 712/210; 712/216
[58] Field of Search ..................... 395/375, 800, 395/382, 386, 391, 800.24, 376; 364/748; 712/206, 210, 200, 204, 216, 215

[56] References Cited

U.S. PATENT DOCUMENTS

| | | | |
|---|---|---|---|
| 4,916,652 | 4/1990 | Schwartz et al. | 364/748 |
| 4,942,525 | 7/1990 | Shintani et al. | 395/375 |
| 5,347,639 | 9/1994 | Rechtschaffen et al. | 395/375 |
| 5,398,321 | 3/1995 | Jeremiah | 395/375 |
| 5,438,668 | 8/1995 | Coon et al. | 395/375 |
| 5,442,760 | 8/1995 | Rustad et al. | 395/375 |
| 5,450,556 | 9/1995 | Slavenburg et al. | 395/375 |
| 5,502,826 | 3/1996 | Vassiliadis et al. | 395/375 |
| 5,511,172 | 4/1996 | Kimura et al. | 395/375 |
| 5,530,817 | 6/1996 | Masubuchi | 395/375 |
| 5,539,911 | 7/1996 | Nguyen et al. | 395/800 |
| 5,542,075 | 7/1996 | Ebcioglu et al. | 395/700 |
| 5,546,599 | 8/1996 | Song | 395/800 |
| 5,574,939 | 11/1996 | Keckler et al. | 395/800 |

*Primary Examiner*—Ahmad F. Matar
*Assistant Examiner*—Saleh Najjar
*Attorney, Agent, or Firm*—Antonelli, Terry, Stout & Kraus, LLP

[57] ABSTRACT

A compact and small compensating-electric-power data processor is realized by dividing a plurality of calculations to be carried out by a complex instruction into a number of executing units to be processed, instead of executing the calculations in parallel as in the past. For this purpose there is provided a decoder having a detecting part for decoding an instruction and for detecting whether the instruction is an instruction for executing a plurality of calculations, a field rearranging part for rearranging a part of the fields of said instruction based on a predetermined number of calculations to be processed if it is judged by said detecting part that the instruction is an instruction for executing a plurality of calculations, and a calculation control part for performing control to execute the calculations in plural cycles in synchronism with the order of said rearranged fields. A calculation part operates to execute the calculations called for by dividing the instruction into plural cycles based on control from the calculation control part.

19 Claims, 19 Drawing Sheets

| OPERATION CODE | SIGNAL 105 | SIGNAL 301 | SIGNAL 302 | SIGNAL 303 | SIGNAL 108 |
|---|---|---|---|---|---|
| COMPLEX INSTRUCTION | 0 | 1 | 0 | 0 | 0 |
| COMPLEX INSTRUCTION | 1 | 0 | 1 | 0 | 1 |
| ADDITION INSTRUCTION | 0 | 0 | 0 | 1 | 1 |
| MULTIPLICATION INSTRUCTION | 0 | 0 | 0 | 1 | 0 |

FIG. 10(b)

| OPERATION CODE 406 | COUNTER VALUE 927 | SIGNAL 1001 | SIGNAL 1002 | ..... | SIGNAL 1003 | SIGNAL 908-1 | SIGNAL 908-2 | ..... | SIGNAL 908-N |
|---|---|---|---|---|---|---|---|---|---|
| COMPLEX INSTRUCTION | 1 | 1 | 0 | ..... | 0 | 1 | 0 | ..... | 0 |
| COMPLEX INSTRUCTION | 2 | 0 | 1 | ..... | 0 | 0 | 1 | ..... | 0 |
| ..... | ..... | ..... | ..... | ..... | ..... | ..... | ..... | ..... | ..... |
| COMPLEX INSTRUCTION | N | 0 | 0 | ..... | 1 | 0 | 0 | ..... | 1 |
| CALCULATION 1 INSTRUCTION | 0 | 0 | 0 | ..... | 0 | 1 | 0 | ..... | 0 |
| CALCULATION 2 INSTRUCTION | 0 | 0 | 0 | ..... | 0 | 0 | 1 | ..... | 0 |
| ..... | ..... | ..... | ..... | ..... | ..... | ..... | ..... | ..... | ..... |
| CALCULATION N INSTRUCTION | 0 | 0 | 0 | ..... | 0 | 0 | 0 | ..... | 1 |

NOTE) CONTROL SIGNAL FOR CALCULATOR 1 IS SET AS SIGNAL 908-1, AND CONTROL SIGNAL FOR CALCULATOR N IS SET AS SIGNAL N, SINCE SIGNAL 408 IS A BATCH OF N SIGNALS

FIG. 11

| SIGNAL 431 | SIGNAL 427 | SIGNAL 405 | SIGNAL 432 |
|---|---|---|---|
| 1 | 0 | 1 | 1 |
|  | ⋮ | ⋮ | ⋮ |
|  | N-2 | 1 | N-1 |
| 0 | 0 | 0 | 0 |
|  | ⋮ | ⋮ | ⋮ |
|  | N-1 | 0 | 0 |

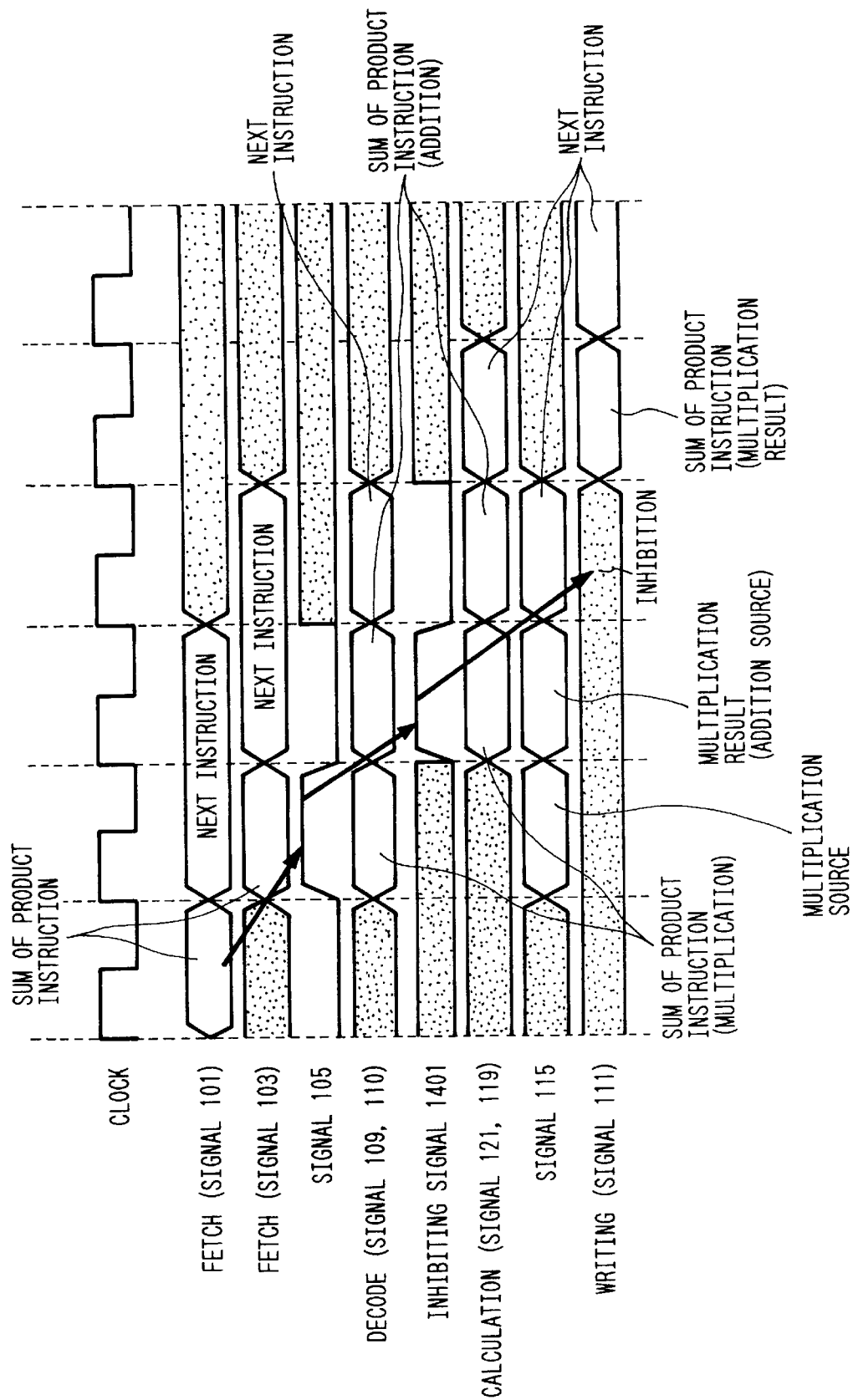

| OPERATION CODE | SIGNAL 105 | SIGNAL 301 | SIGNAL 302 | SIGNAL 303 | SIGNAL 108 | SIGNAL 1401 |
|---|---|---|---|---|---|---|
| COMPLEX INSTRUCTION | 0 | 1 | 0 | 0 | 0 | 0 |
| COMPLEX INSTRUCTION | 1 | 0 | 1 | 0 | 1 | 0 |
| ADDITION INSTRUCTION | 0 | 0 | 0 | 1 | 1 | 0 |
| MULTIPLICATION INSTRUCTION | 0 | 0 | 0 | 1 | 0 | 0 |
| SUM OF PRODUCT INSTRUCTION | 0 | 1 | 0 | 0 | 0 | 0 |
| SUM OF PRODUCT INSTRUCTION | 1 | 0 | 1 | 0 | 1 | 1 |

DATA PROCESSOR FOR PROCESSING A COMPLEX INSTRUCTION BY DIVIDING IT INTO EXECUTING UNITS

BACKGROUND OF THE INVENTION

The present invention relates to a data processor for processing data based on instructions and, more particularly, for processing a complex instruction to a data processor calling for a plurality of calculations to be executed.

An instruction for performing a plurality of calculations (hereinafter, referred to as a "complex instruction"), such as a VLIW instruction, realizes high speed processing in a data processor by increasing the number of calculations processed at the same time.

In order to increase the number of calculations carried out in one machine cycle, there has been a system where calculations are executed in parallel and the calculated results are produced at one time.

Further, when an exceptional processing, such as overflow or the like, appears during execution of calculations instructed by a complex instruction, all of the calculations instructed by the complex instruction have been re-executed by software similar to that used for the processing of a common single instruction.

In the processing described above, it is necessary to provide hardware to control the operation of a plurality of calculators in parallel and to store a plurality of calculated results at one time, which makes the processor complex. Further, the amount of hardware, such as parts to be used, is increased, which interferes with the ability to realize a compact and small-power-consuming data processor.

Furthermore, when an exception occurs, some calculations producing normal calculated results are also re-executed by the software. This makes the overhead of the processing upon occurrence of an exception large.

SUMMARY OF THE INVENTION

An object of the present invention is to realize a compact and small-power-consuming data processor which is capable of processing a complex instruction having a plurality of calculations by dividing it into a plurality of executing units.

Another object of the present invention is to realize a data processor which executes processing upon occurrence of an exception by re-executing only the part of the instruction concerning the calculation producing the exception.

According to the present invention, a data processor comprises a decoder having a detecting part for decoding an instruction and for detecting whether or not the instruction is an instruction executing a plurality of calculations, an instruction generating part for rearranging the instruction code of the instruction into an instruction code for processing in plural cycles based on a predetermined number of calculations to be processed in one cycle, if it is judged by the detecting part that the instruction is an instruction for executing a plurality of calculations, and a calculation control part for performing control to execute the calculations of the instruction whose instruction code has been rearranged; and a calculation part for executing the calculations specified by dividing the instruction into plural cycles based on the control from said calculation control part.

Further, according to the present invention, the data processor comprises an exception register for holding an instruction in which an exception processing occurs and for holding calculated results obtained by already executed calculation processing or calculations not executed yet, when the exception processing occurs in the calculation processing by said calculation part.

In this way, since processing of an instruction executing a plurality of calculations can be carried out by dividing it into plural cycles based on a predetermined number of calculations per cycle, the required number of calculators is decreased and the structure of the control part for controlling the calculators is simplified. Therefore, it is possible to provide a data processor which is small in size and in electric power consumption, while maintaining a compatibility with a high speed data processor for processing instructions for executing a calculation having a high parallel degree.

Further, by detecting, holding and processing the calculations according to the units of execution, at the occurrence of an exception, it is possible to eliminate the necessity of re-executing all calculations, so that the exception processing can be performed in a short time.

BRIEF DESCRIPTION OF THE DRAWINGS

FIG. 10(b) shows a decoding table according to the present invention.

FIG. 11 shows a truth value table of a counter according to the present invention.

FIG. 15 is a timing chart relating to processing a sum-of-product instruction.

DETAILED DESCRIPTION OF THE PREFERRED EMBODIMENTS

Figure 17:
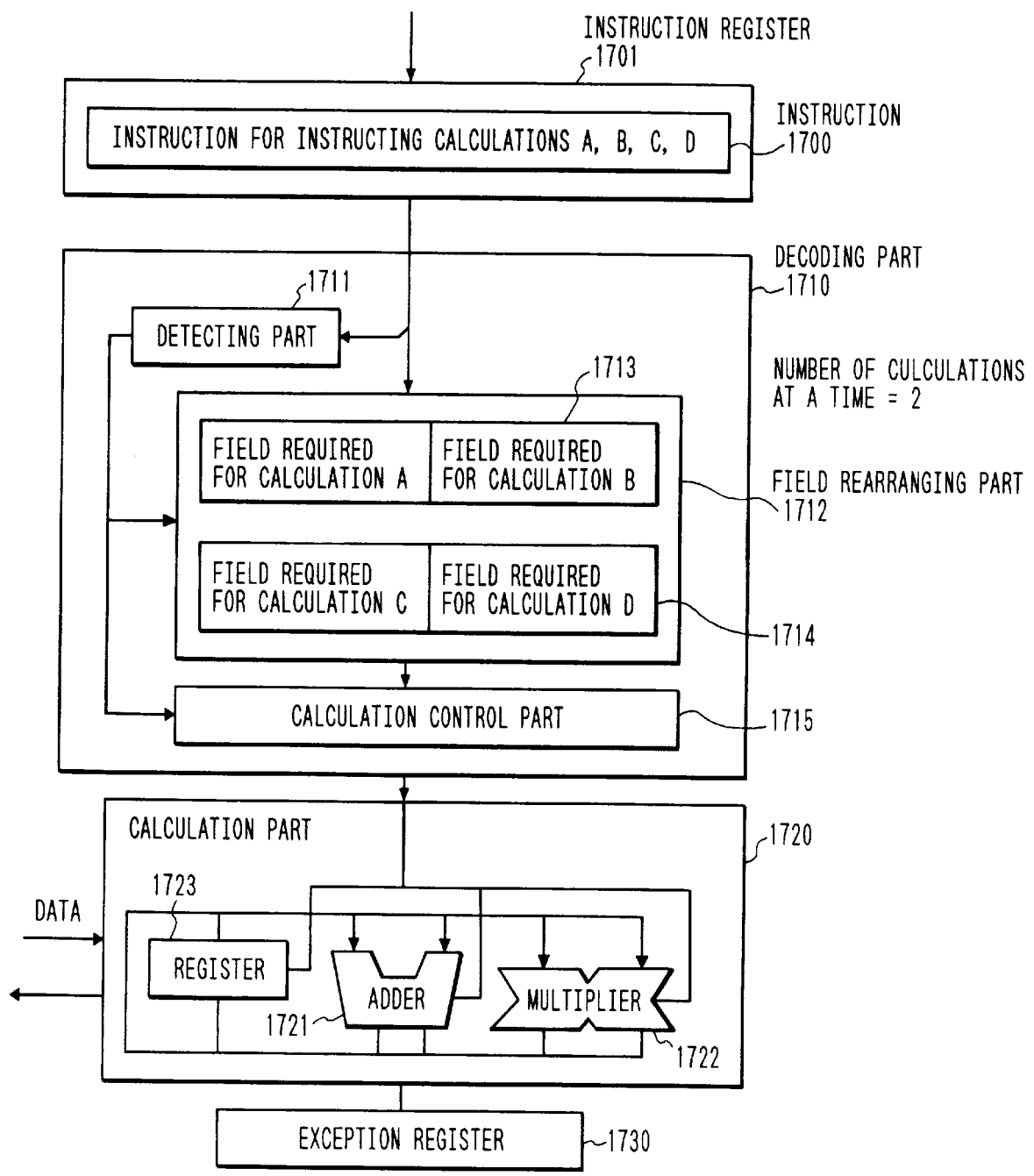
FIG. 17 is a structural diagram showing features of the present invention.

FIG. 17 shows an outline of the present invention.

An instruction 1700 for processing a single calculation instruction or for carrying out plural calculations is read out from a memory or the like (not shown) and is held in an instruction register 1701. The instruction 1700 is input to a decoding part 1710 from the instruction register 1701, where it is detected by a detecting part 1711 to determine whether the instruction is an instruction for carrying out a plurality of calculations.

If it is judged from the detected result produced by the detecting part 1711 that the instruction is a single instruction, a field rearranging part indicated by the numeral 1712 passes the instruction through without modification to a calculation control part 1715, and a calculation control signal is generated by the calculation control part 1715, indicating common calculation processing, to control a calculation part 1720 and execute the calculation processing.

If it is judged from the detected result of the detecting part 1711 that the instruction is a complex instruction, the field rearranging part 1712 rearranges the fields required for the calculations from the instruction based on a predetermined number of calculations and an order of calculations. Since the number of calculations, the kinds of calculations and the order of calculations are predetermined, control signals for controlling the calculating part 1720 are generated in the calculation control part 1715 in synchronism with the rearranged fields. The calculation part 1720 accesses the data from a register 1723 and executes a calculation using the calculators 1721 or 1722 based on the control signals.

Therein, the detecting part 1711 may detect whether or not the instruction has a larger number of calculations than the number of calculations typically processed at one time, as well as whether or not the instruction is an instruction for carrying out a plurality of calculations. In this case, if it is judged that the instruction calls for a smaller number of calculations than the number of calculations typically processed at one time, the instruction generating part 1712 passes the instruction through to the calculation control part 1715 without modification to execute the calculation processing.

Further, in a case where it is known in advance that instructions to be executed consist of only instructions calling for plural calculations or only instructions calling for a larger number of calculations than the number of calculations typically processed at one time, the detecting part 1711 is not necessary.

And, it is obvious from the purpose of the present invention that the number of calculations typically processed at one time is determined by the number of calculators, and that the invention is concerned with the situation in which the number of the calculators employed is smaller than the largest number of calculations required among the instructions held in the instruction register.

However, it is not necessary for all of the calculators to be used in the processing of a given instruction, but it is possible to execute processing by specifying a smaller number of calculations, depending on the method of data processing (including the contents of a program) or the need for a saving of the consuming electric power (in a case of battery driving).

In a case where calculators themselves are designed for special use, that is, where the calculating part is composed of adders and multipliers, it is possible to execute processing by setting a smaller number of calculations, so as to use only special or particular calculators, for example, only the adders.

The present invention now will be described in more detail.

Figure 1:
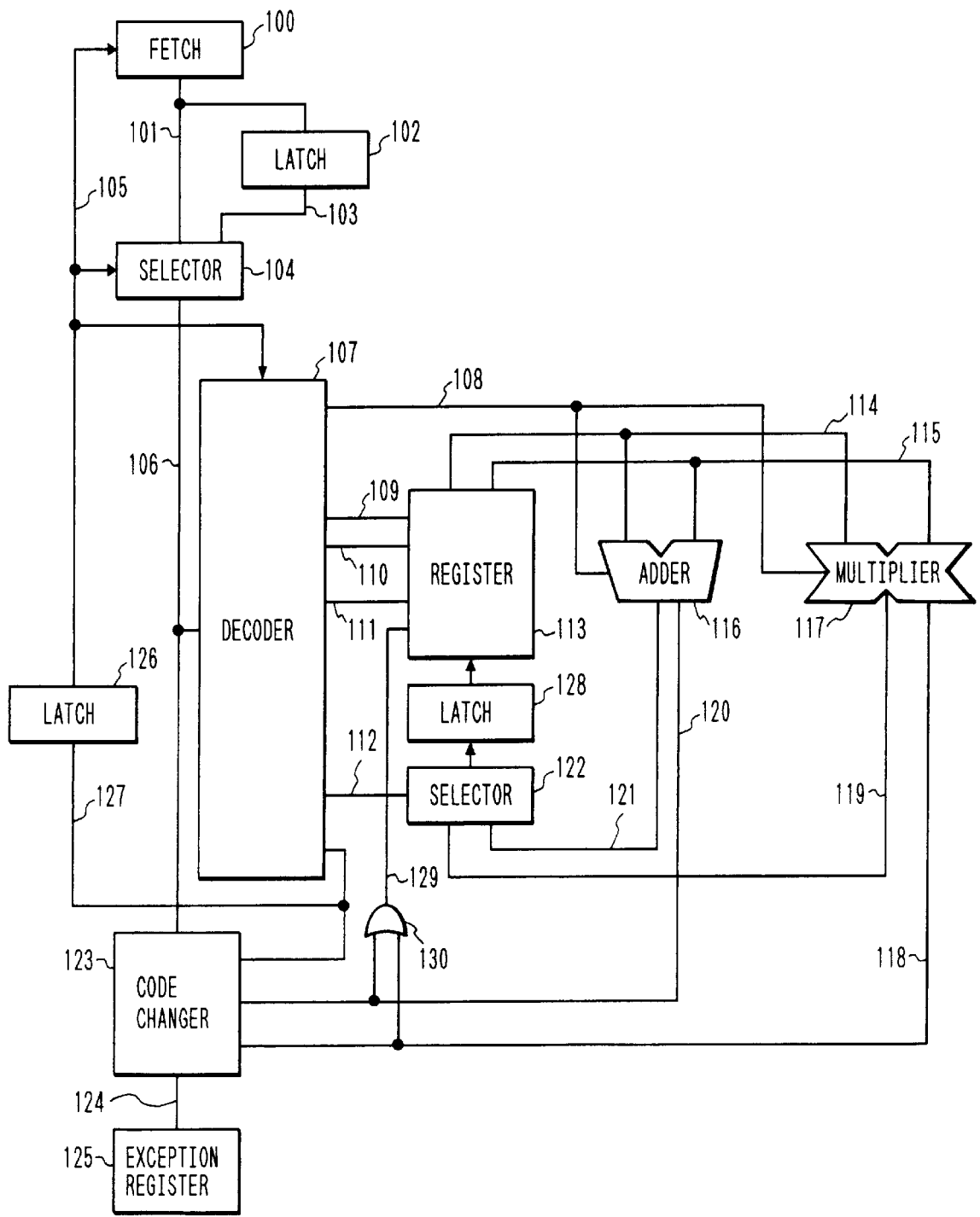
FIG. 1 is a block diagram of an embodiment according to the present invention.

FIG. 1 shows an embodiment of the present invention.

The embodiment comprises a fetch part 100 for supplying instruction code on line 101 every cycle; a latch 102 for holding an instruction code supplied on line 101; a selector 104 for selecting either the line 101 from the fetch part 100 or the line 103 from the latch 102 for supplying an instruction; code on a line 106; a decoder 107 for decoding the instruction code received on line 106 and for specifying control information on line 108 to enable calculators to be operated, and register numbers on lines 109 and 110 for selecting a register for storing data used for the specified calculations; a register 113; a multiplier 117; an adder 116 operated in response to the decoded results on lines 108, 109, 110 and 111; a code changer 123 for changing the instruction code on line 106 depending on causes of an exception at the occurrence of a calculation exception; and an exception register 125 for storing a changed instruction code received on line 124 at the time of an exception so as to transfer the information to software for exception processing.

The normal instruction code in this embodiment executes a series of operations, including fetching an instruction code, decoding the instruction code, reading out a register, calculating, and writing a calculated result into a register.

Figure 2A:
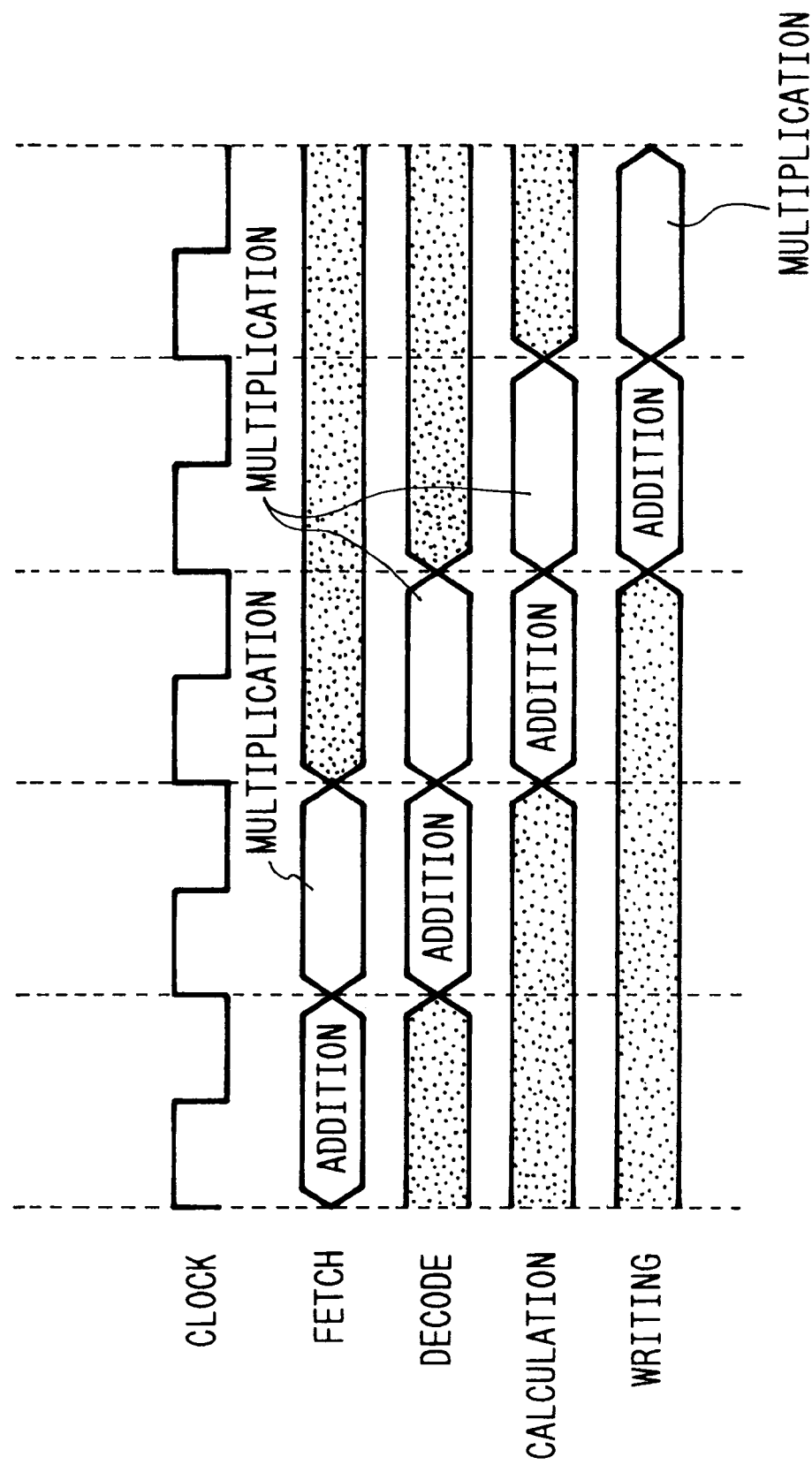
FIG. 2(a) is a timing chart of an embodiment according invention during processing of a normal instruction.

FIG. 2(a) shows a timing chart in a case where an addition instruction is followed by a multiplication instruction. As shown in the figure, the instructions can be released with a one-cycle pitch, and can be written with a one-cycle pitch. This embodiment does not have the parallel operating function of an adder and multiplier combination. Therefore, in this case, a complex instruction for performing addition and multiplication has to be processed in two cycles.

Figures 3A, 3B:
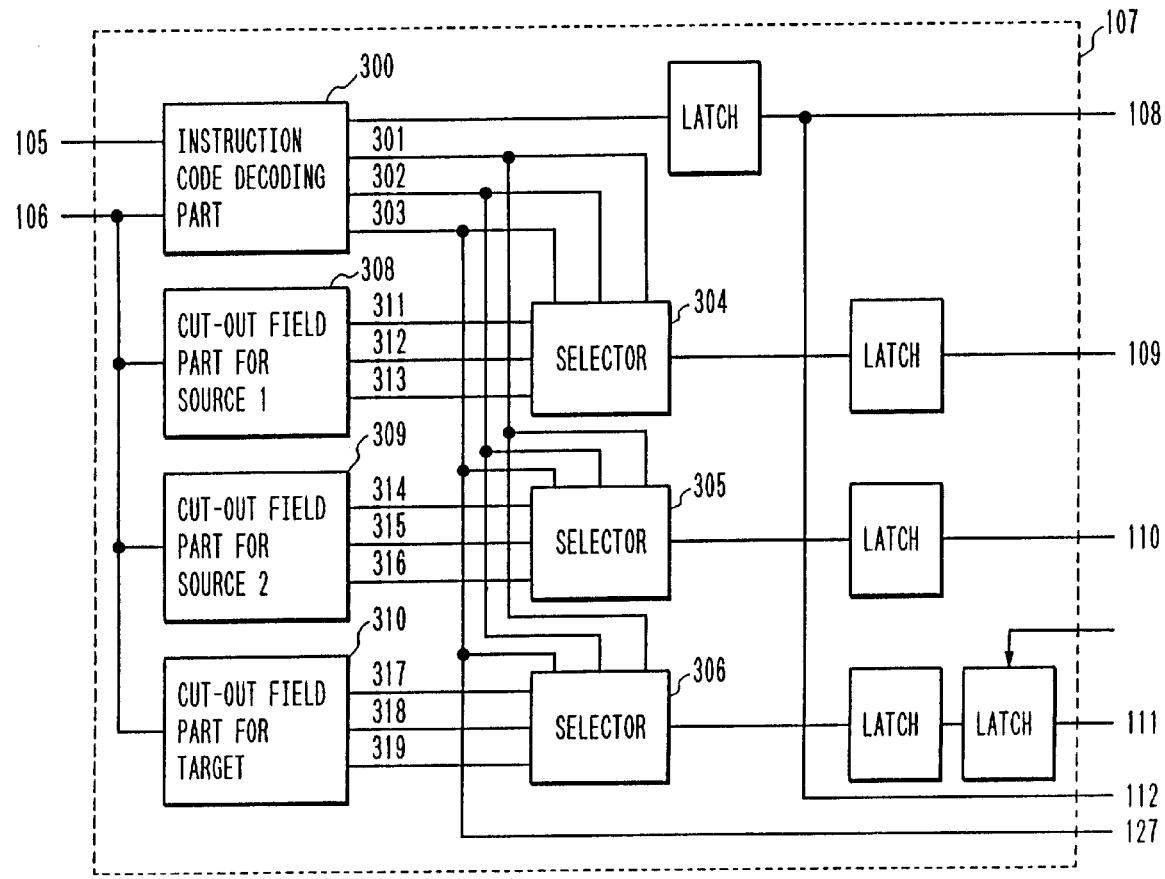
FIG. 3(a) shows a block diagram of an embodiment of a decoder according to the present invention.
FIG. 3(b) is a decoding table.

The above-mentioned processing will be described below. A complex instruction code output from the fetch part 100 on line 101 is transmitted to the selector 104. The complex instruction code on line 101 is selected in the selector 104 assuming that the preceding instruction is not a complex instruction, and the complex instruction code is supplied to the decoder 107. FIG. 3 is a detailed diagram showing an example of the decoder 107, which receives the instruction code on line 106. The decoder 107 comprises an instruction code decoding part 300 for specifying kinds of instructions, cut-out field part 308 for source 1, cut-out field part 309 for source 2 and cut-out field part 310 for target for cutting out different fields depending on the kinds of the instructions, and selector parts 304, 305 and 306 for selecting the fields 311 to 319 cut out in advance from the cut-out field parts corresponding to the outputs 301 to 303 from the instruction code decoding part 300. The outputs 311, 314, 317 from the cut-out field parts indicate the contents of the register field for multiplication of a complex instruction, while the outputs 312, 315, 318 indicate the contents of the register field for addition of a complex instruction, and the outputs 313, 316, 319 indicate the contents of a register field for a normal instruction. In this example, since the instruction code on line 106 is a complex instruction and the signal on line 105 is zero, due to a normal instruction having been decoded in the preceding cycle, the signal 301 among the signals 301 to 303 is asserted based on the decoding table in FIG. 3(b). From this decoded result, the selectors 304 to 306 in FIG. 3(a) select the register fields 311, 314 and 317, respectively, for multiplication in response to the complex instruction.

Further, a signal 127 is asserted indicating a state a processing a complex instruction. With the decoded results 108 to 112, data for multiplication is read out on lines 114 and 115 from the register 113 to the multiplier 117, which is enabled by the control information on line 108, and the result of multiplication on line 119 is written in the register 113 via selector 122 and latch 128.

The above is the processing of the complex instruction in the first cycle.

With the latch 126, the signal 127 can reproduce as a signal 105 in the next cycle so that the decoded information of the instruction code in the preceding cycle can be used again in the processing in the following cycle.

The operation of each of the blocks in the second cycle of the complex instruction using the signal 105 will be described below. The fetch part 100 outputs the following instruction on line 101 to the selector 104. However, since the signal on line 105 to the fetch part 100 operates as a supply stopping signal, the fetch part 100 will continue to output the instruction code for the next instruction on line 101 so long as the signal 105 is asserted. The selector 104, however responds to the signal on line 105 to select the complex instruction on line 103, which is the instruction code stored in the latch 102 in the preceding cycle. Since the instruction code on line 106 is the complex instruction code and the control signal on line 105 has changed to 1, the signal 302 among the signals 301 to 303 is asserted in the decoder 107, according to the decoding table in FIG. 3(b).

As a result, a respective register number for addition of the complex instruction is selected in each of the selectors 304 to 306.

Figure 2B:
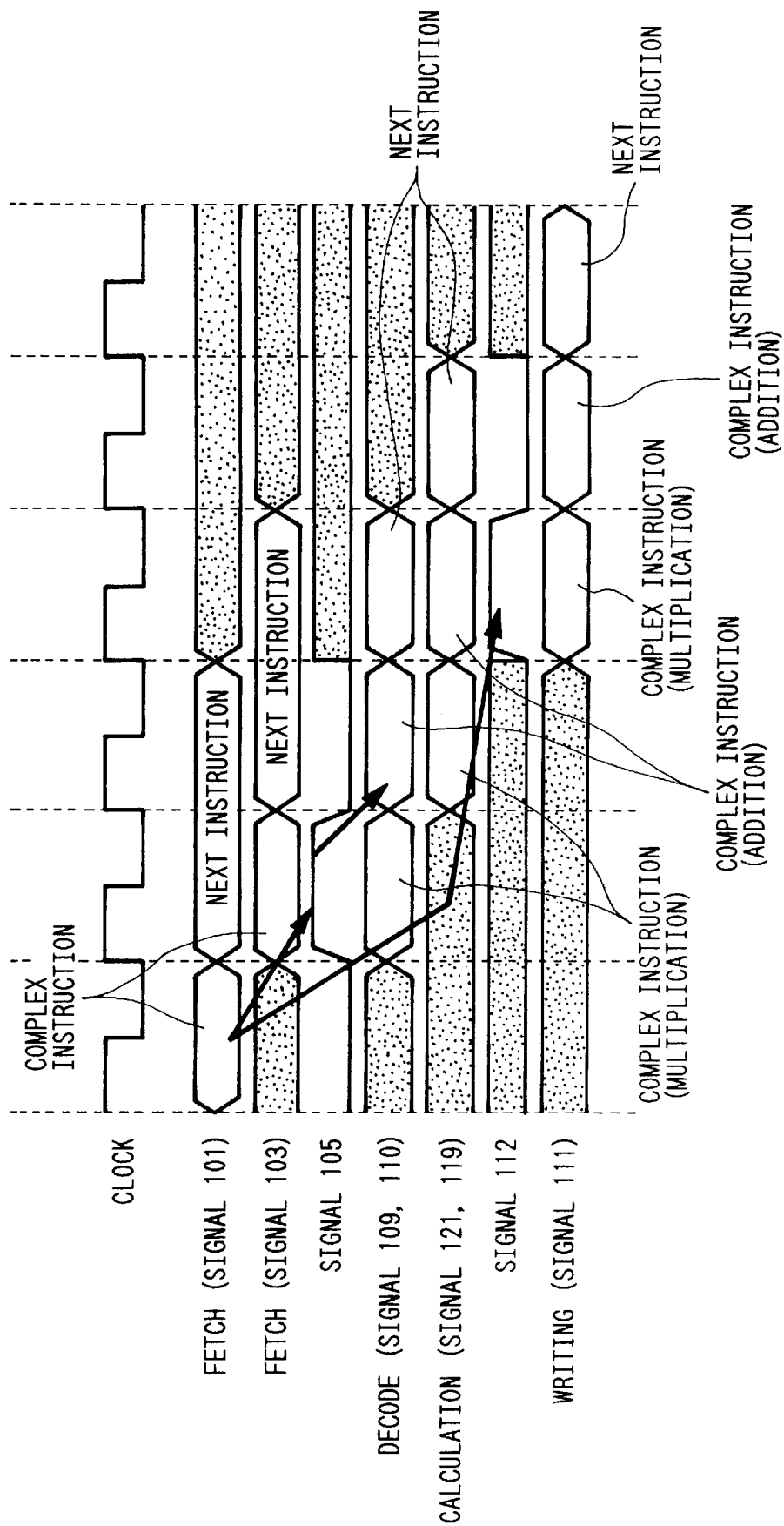
FIG. 2(b) is a timing chart of an embodiment according to the present invention during processing of a complex instruction.

In addition to this, a signal 127 indicating a state of processing a complex instruction is negated. Based on the decoded result, the data to be added is read out on lines 114 and 115 from the register into the adder 116, which is enabled by the control information 108, and the calculated result on line 121 is written in the register 113 via selector 122 and latch 128. The above is the processing in the second cycle of the complex instruction. Since the signal 105 will now be negated and the instruction code on line 101 which has been held from the preceding cycle now will be transferred to the decoder 107 by the selector 104, processing of the instruction following the complex instruction can be continued in a correct executing order in the next cycle. FIG. 2(b) shows the timing of the above operations. After releasing the complex instruction, the fetch (signal on line 101) releases the next instruction for the next two cycles, since the signal 105 is asserted in the next cycle. The fetch (signal on line 103) is one cycle behind the signal 101, as shown in the figure since the signal corresponds to the signal 101 of the previous cycle, as held in the latch 102. Since the selector 104 selects the signal 103 following the signal 101 and then signal 101 during the two cycles, the decoder 107 executes the complex instruction during the two cycles. Further, since the signal 105 is asserted in the second cycle, the contents of the signals 109, 110 of the decoded result are, as shown in the figure, instructions to the register 113 to read out the data for multiplication in the first cycle and to read out the data for addition in the second cycle. The signal 108 enables operation of the multiplier in the first cycle and operation of the adder in the second cycle. The signal 112, which is matched in timing with the output of the calculator by being derived from the signal 108, is asserted only in the first cycle, as shown in FIG. 2(b). With this signal 112, the selector 122 selects the multiplication result in the first cycle and the addition result in the second cycle in response to the signal 112 and outputs the calculation results in synchronism with writing timing in the register 113 through the latch 128. The signal 111 is an instruction for writing of the multiplication result in the first cycle and an instruction for writing of the addition result in the second cycle, as shown in the figure.

The above is the processing in a case where calculations are normally completed.

In the case of occurrence of a calculation exception during multiplication processing, the instruction code is changed to an exception code by code changer 123 in response to the signal on line 118, and a signal 129 is transmitted via OR gate 130 to the register 113 to inhibit writing to the register. The changed instruction code is used when the exception instruction is re-executed.

Figure 4:
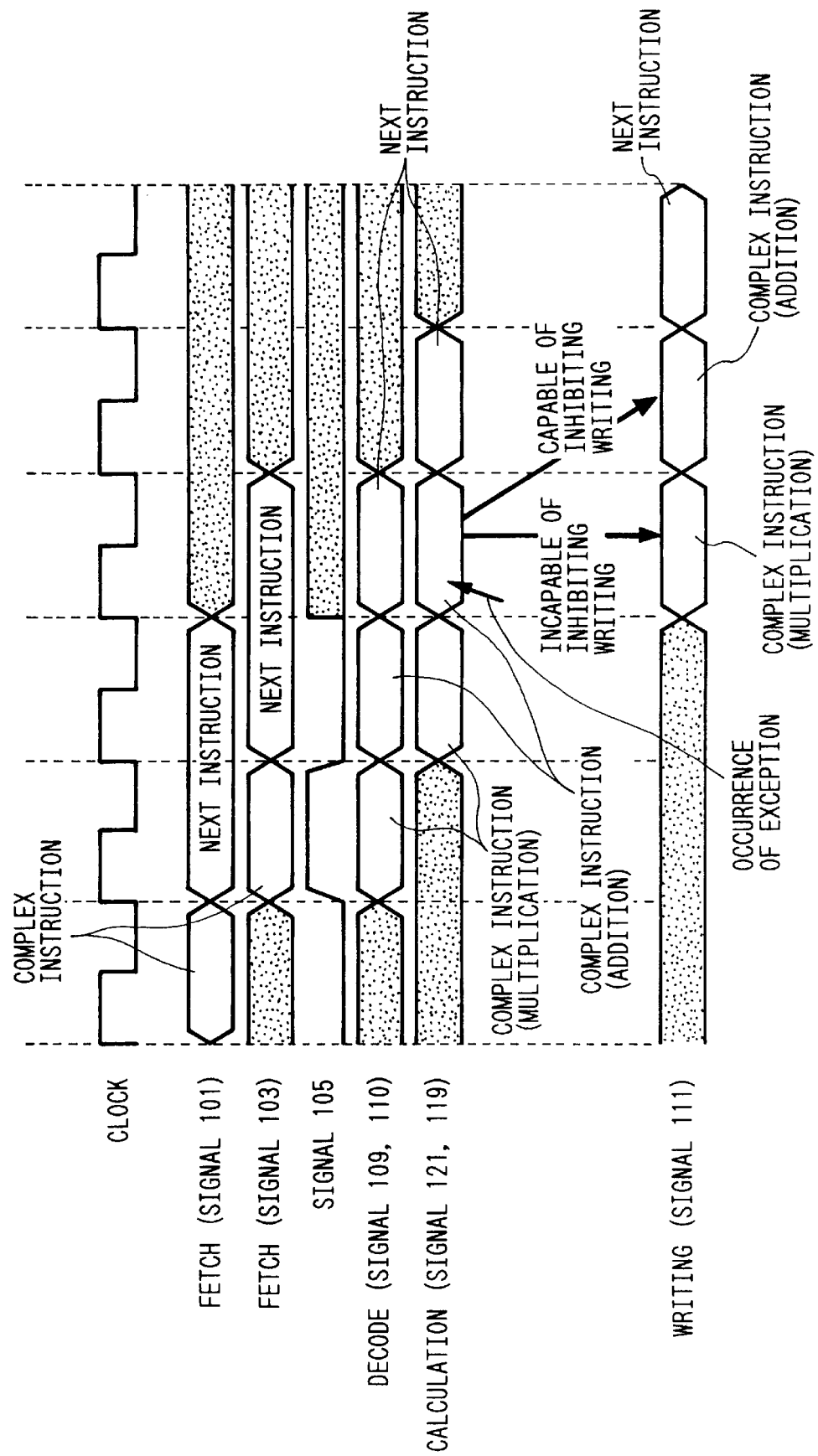
FIG. 4 is a timing chart of an embodiment according to the present invention relating to the occurrence of an exception in a complex instruction.
Figure 5:
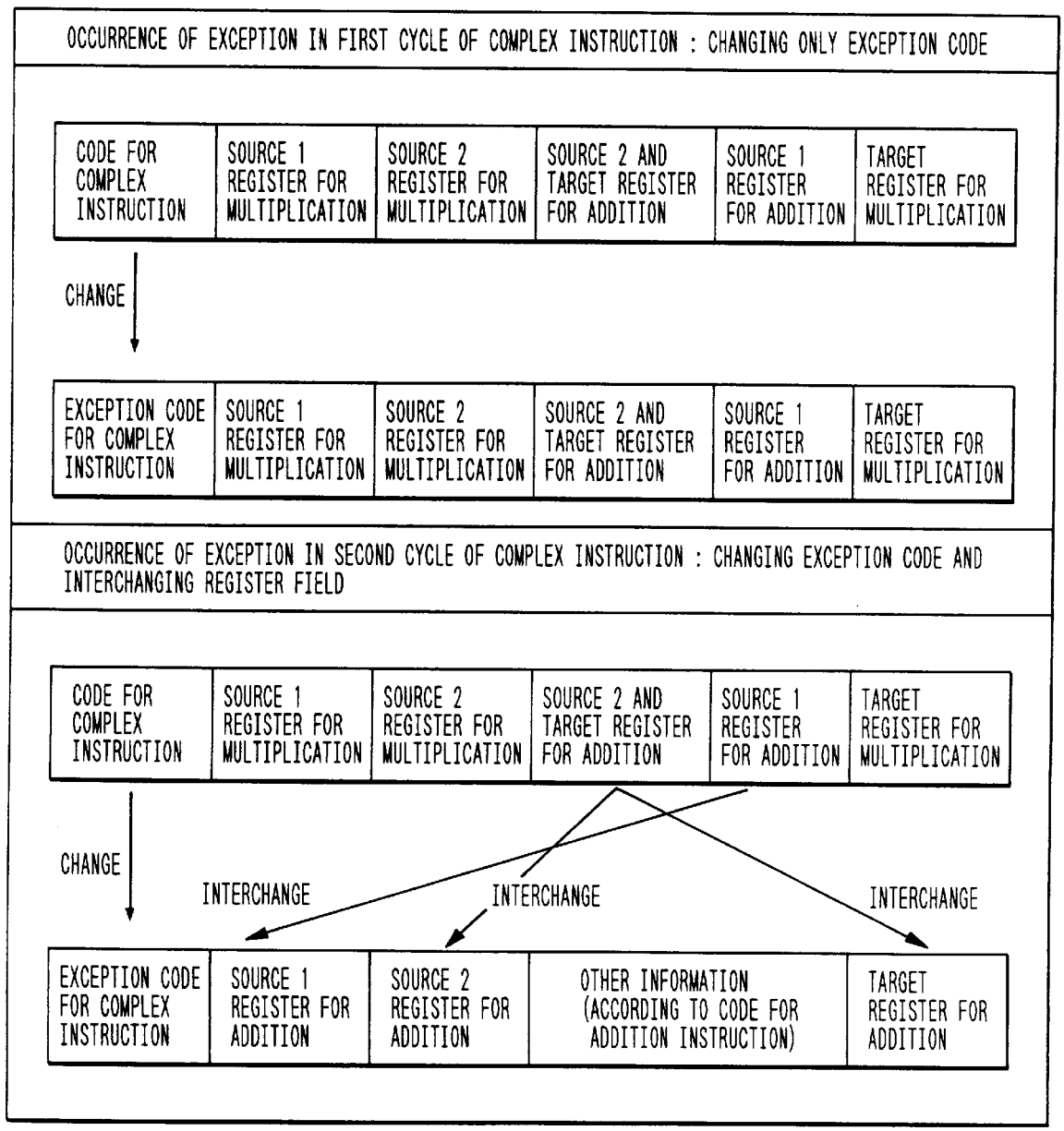
FIG. 5 is a diagram explaining the code changing in an embodiment according to the present invention.
Figure 6:
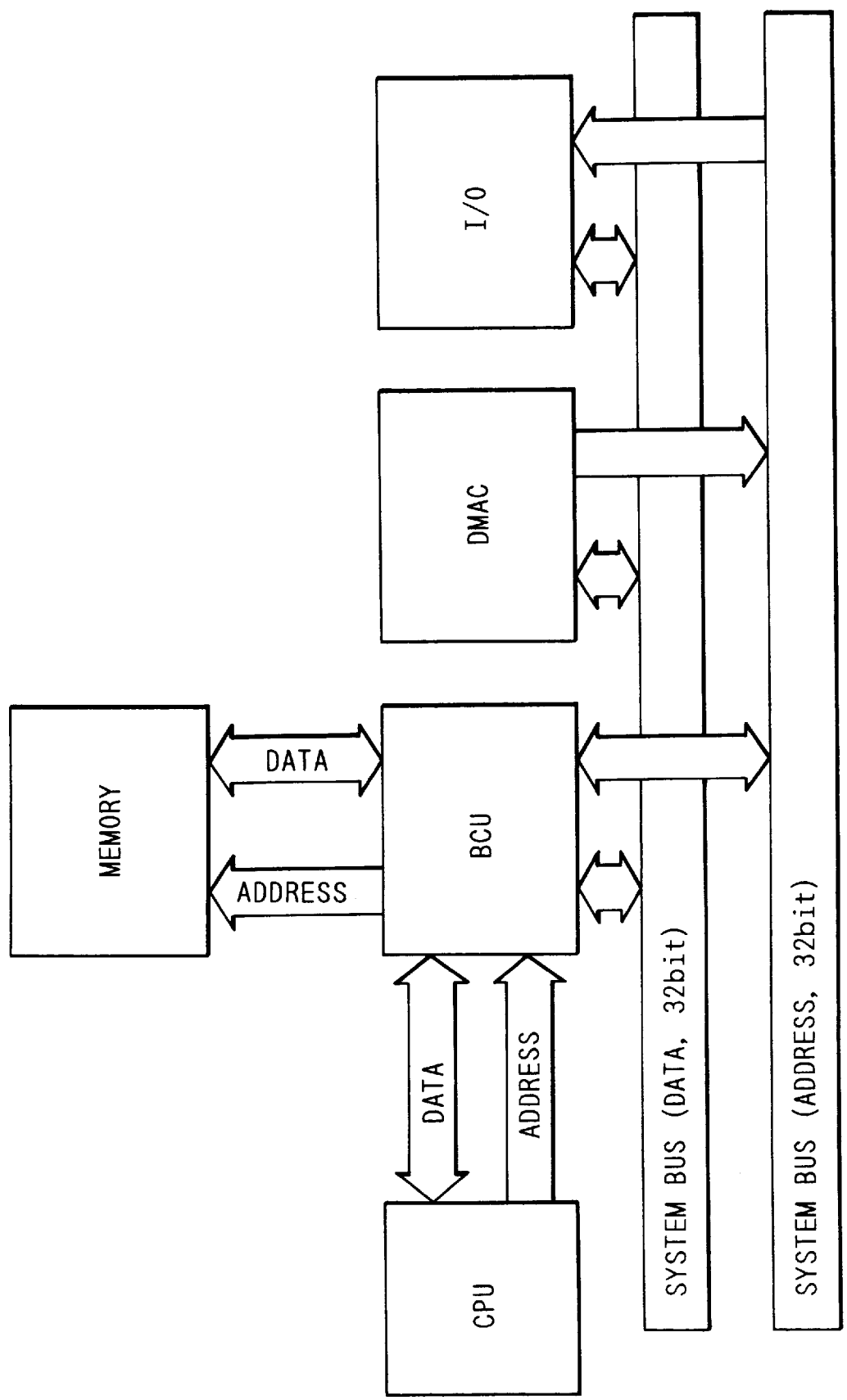
FIG. 6 is a block diagram showing a system employing an embodiment according to the present invention.

In a case where a calculation exception occurs during an addition processing in a complex instruction processing, as shown in FIG. 4, the multiplication processing in the first cycle is completed and the multiplication result is written in the register 113, since there is insufficient time for the inhibiting signal 129 which controls writing of the result in the register. Therefore, in a case of occurrence of an exception during addition processing, the part of the instruction to be re-executed by software is only the addition processing part. Thereby, the code changer 123 changes the instruction code in response to the control signal 120 and the control signal 127 indicating that the processing being carried out is for a complex instruction. In a case where the control signal 127 is negated, that is, during the first cycle of the processing, only the instruction code 106 for the complex instruction is changed and the result is stored in the exception register 125, as shown in FIG. 5. In a case where the control signal 127 is asserted, that is, during the second cycle of the processing, a code for an addition instruction is produced by extracting the register number for addition from the complex instruction and the code for the instruction is changed to the exception code for the addition instruction and is stored in the exception register 125. By doing so, it is possible that the multiplication processing is not re-executed and only the addition processing is re-executed. Therewith, a complex instruction can be processed without a large algorithm for a parallel operating function, and a compact and small electric power consuming computer can be realized. FIG. 6 shows an embodiment of a system using a CPU capable of executing such processing. Since it is possible to make the CPU small in size, the whole system can be made compact and the consuming electric power can be suppressed to a small value.

Figure 7:
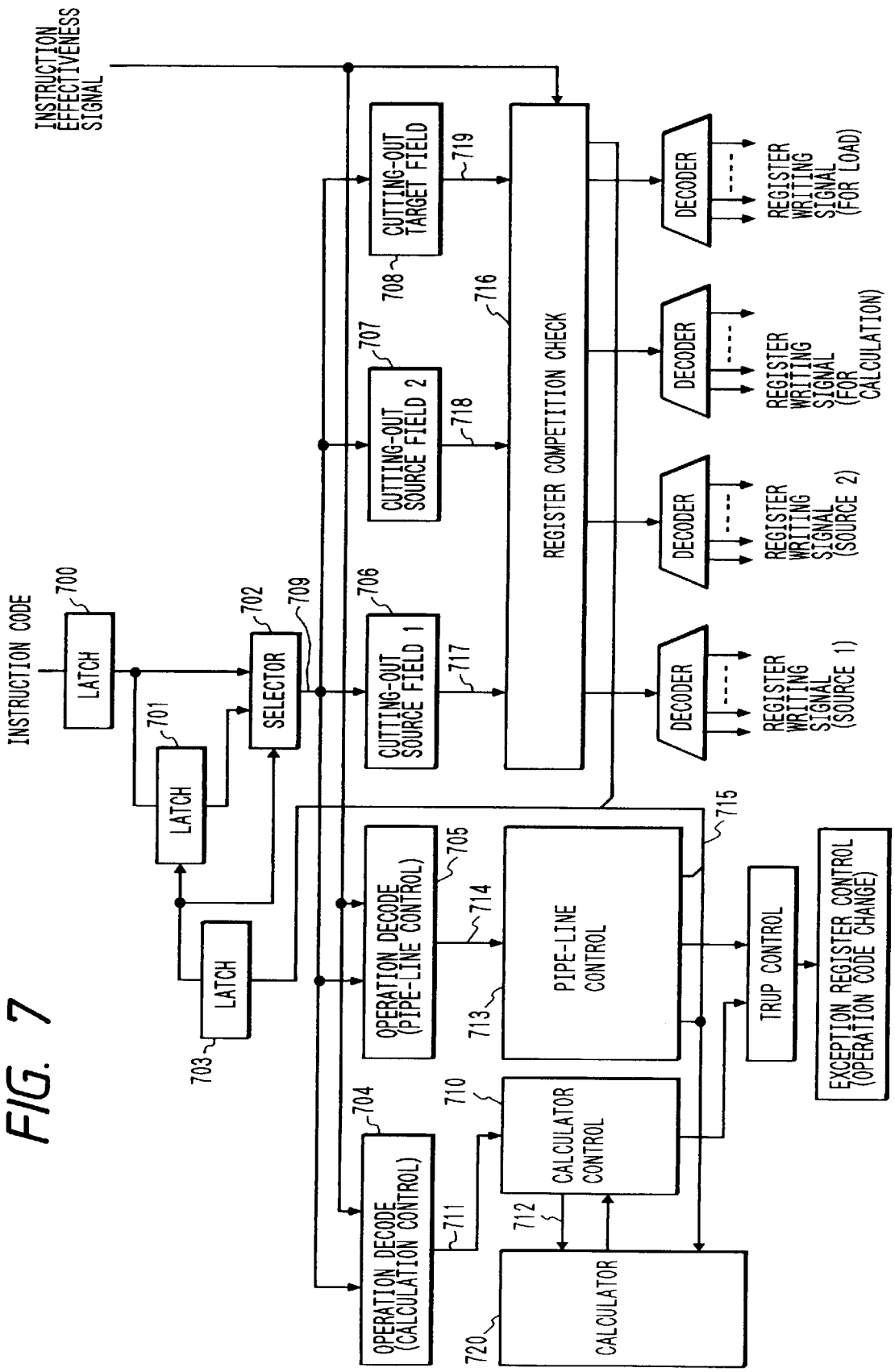
FIG. 7 is a block diagram showing another embodiment according to the present invention.
Figure 8:
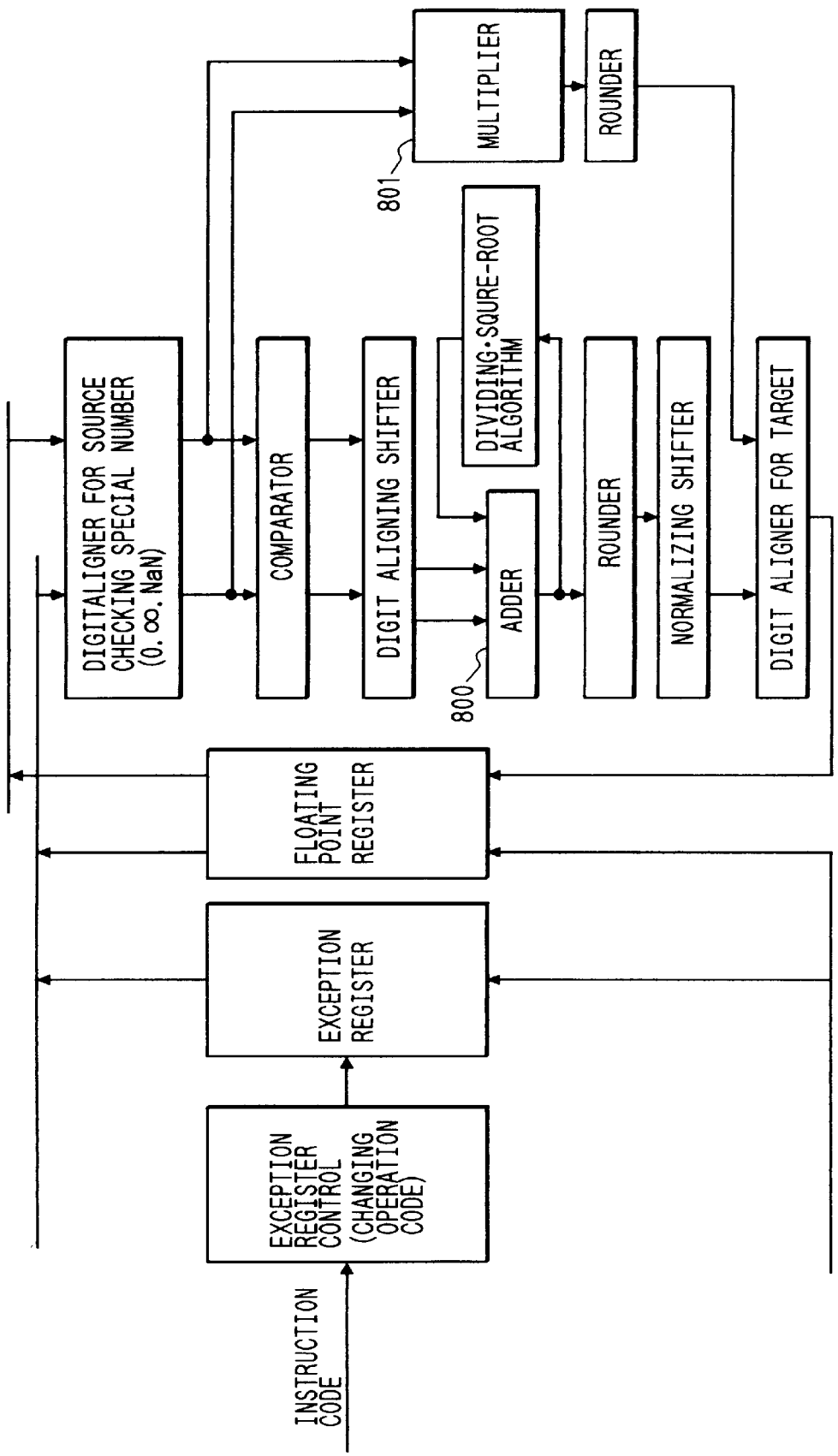
FIG. 8 is a block diagram showing another embodiment of a calculation part according to the present invention.

FIG. 7 shows an embodiment where the present invention is applied to a floating point processor. The numerals 700 to 703 indicate sequencers for releasing the instruction code of a complex instruction during two cycles. The processor has a function to stop the latch 701 and hold an instruction code of the next instruction when a pipe-line for executing an instruction is disturbed. The disturbance of the pipe-line for executing an instruction is produced when competition for using a register between instructions or an adder is used as a loop in calculation of division or square-root. The parts 704 to 708 extract corresponding bits from an instruction code 709, respectively. A calculation control part 710 produces a signal 712 for supplying necessary control to a calculator 720 for each of the instructions in response to a decoded result 711. A pipeline control 713 produces a signal 715 for control of a disturbance in the pipe-line caused by a difference in the numbers of executing steps by the instruction from the decoded result 714. A register competition check 716 detects competition for a register by comparing the cut-out register fields 717 to 719 between instructions. The calculator 720 is essentially composed of an adder 800 and a multiplier 801, as shown in FIG. 8. Calculation of division or square-root is executed by repeating the use of the adder 800.

Figure 9:
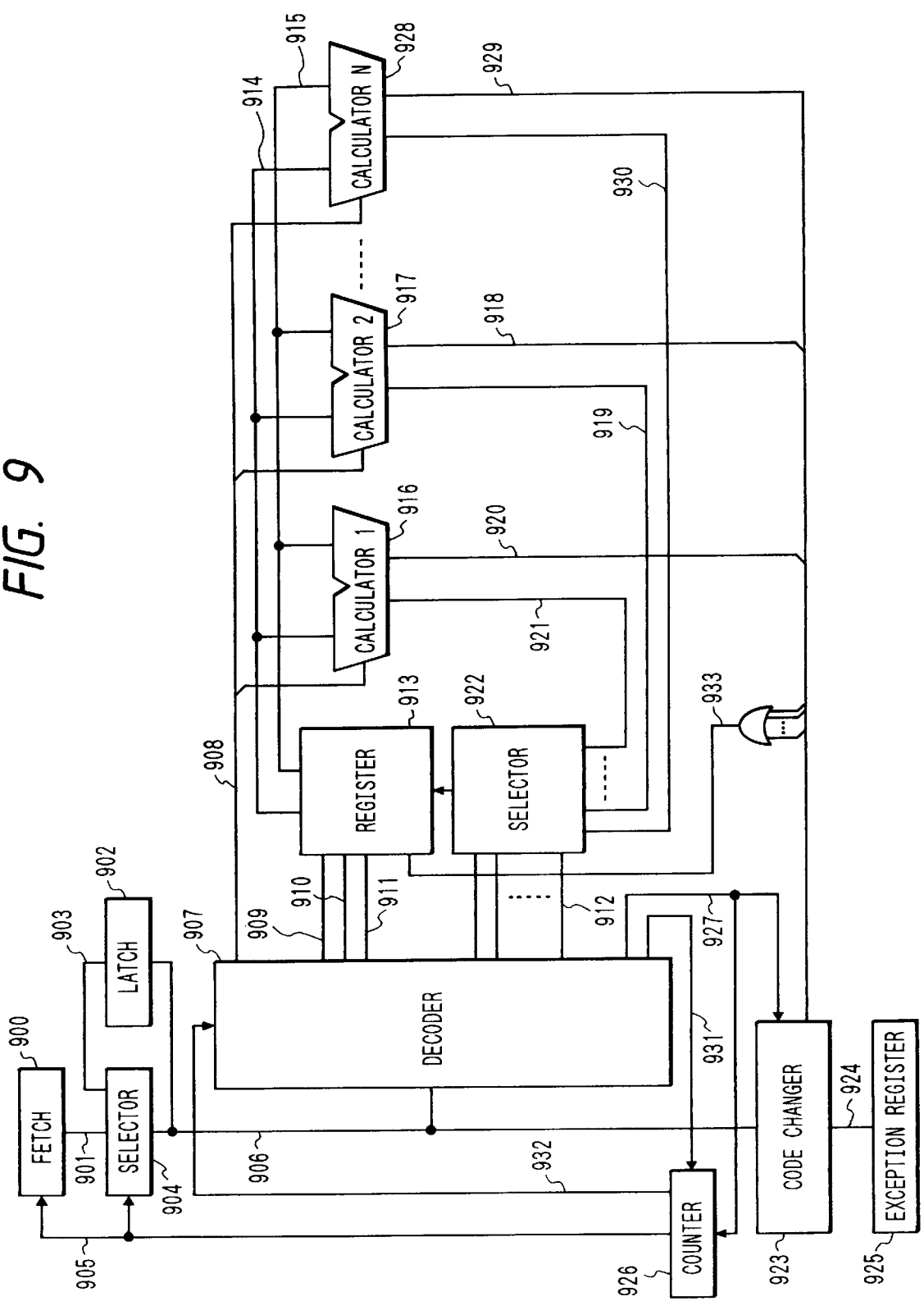
FIG. 9 is a block diagram showing a further embodiment according to the present invention.

Having described the embodiment of a processor for a set of instructions composed of complex instructions having two calculations, as another embodiment, FIG. 9 shows an embodiment of a processor for a set of instructions in which the number of calculations specified by a complex instruction is 2 to N.

In this embodiment, the processing for a complex instruction covering N cycles is executed as follows. An instruction code of a complex instruction output from a fetch part 900 on line 901 is transmitted to a selector 904. In a case where the preceding instruction is not a complex instruction, the selector 904 selects the complex instruction code 901. In a decoder 907, decoding is executed to execute multiplication for a selected complex instruction based on the decoding table in FIG. 10(b). That is, in the detailed diagram of FIG. 10(a), since the instruction code on line 906 is a complex instruction and the value on line 905 from a counter 926 is 0, a signal 1001 among signals 1001 to 1004 is asserted and register numbers for calculation 1 of the complex instruction are selected in each of the selectors 1006 to 1008. And, a signal 931 indicating a state of processing a complex instruction is asserted. Based on the decoded result, items of data on lines 914 and 915 for calculation 1 are read out from register 913 to a calculator 1 (916), which is enabled by the signal on line 108, and the calculated result on line 921 is written in the register 913 via selector 922, which is enabled by the signal on a line 912. The above is the processing in the first cycle.

Figure 10A:
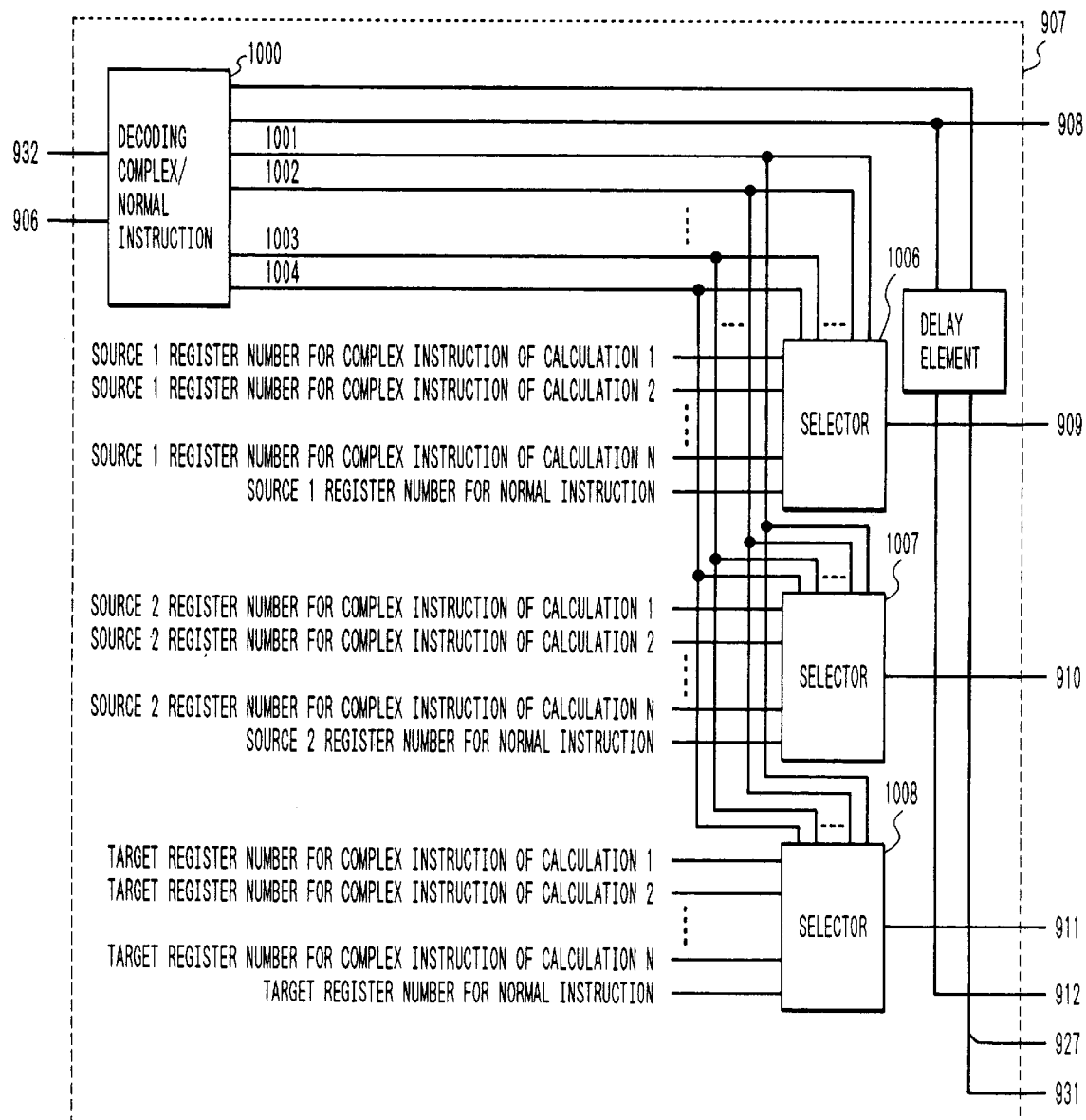
FIG. 10(a) is a block diagram of another embodiment of a decoder according to the present invention.

Since an enable signal on line 931 is asserted in a counter 926 based on FIG. 10(b), the counter value is updated by the signal on line 927 to produce a new counter value on line 932. With the counter 926, the decoded information 927 of the instruction code in the preceding cycle can be used to provide a signal on line 905 and a counter value on line 932 in the next cycle. Each of the blocks in the second cycle of the complex instruction using the signal on line 905 and the counter value on line 932 will be described below. The fetch part 900 outputs the next instruction code to the selector 904. Since the supply stopping signal 905 is asserted, the fetch part 900 continues to output this next instruction code on line 901. Since the control signal on line 905 to the selector is a decoded signal of the complex instruction and is asserted, the selector 904 selects line 903 from latch 902, which provides the complex instruction code from the preceding cycle. In the decoder 907, since the control signal on line 905 is asserted and the counter value on line 932 indicates 1, the decoding for executing the calculation 2 for the selected complex instruction is executed according to the truth value table shown in FIG. 10(b). That is, in the detailed diagram of the decoder in FIG. 10(a), since the instruction code on line 906 is for a complex instruction, the signal on line 905 is 1 and the counter value on line 932 is 1, the signal 1002 among the signals 1001 to 1004 is asserted and a register number for calculation 2 of the complex instruction is selected in each of the selectors 1006 to 1008. And, the signal on line 931 indicating a state of processing a complex instruction continues to be asserted and is kept in this state. Based on the decoded result, data on lines 914, 915 for calculation 2 are read out from the register 113 to the calculator 2 (917) and the calculated result 918 is written in the register 913 via selector 922. The above is the processing in the second cycle of the complex instruction. Since the enable signal on line 931 of the counter 926 is kept in an asserted state, the counter value on line 932 from the counter 926 is re-updated based on FIG. 11 and the supply stopping signal on line 905 to the fetch unit 900 is kept in an asserted state as well.

A series of these operations are repeated up to the decoding for calculation N–1 (which corresponds to the counter value of N–2). In the decoding for calculation N. since the control signal on line 905 is asserted and the counter value on line 932 indicates N–1, as shown in FIG. 11, the decoding to execute calculation N for the selected complex instruction 906 is executed based on the truth value table of FIG. 10(b). That is, as seen in the detailed diagram of the decoder in FIG. 10(a), since the instruction code on line 906 is a complex instruction, the signal on line 905 is 1 and the counter value on line 932 is N–1, the signal 1004 among the signals 1001 to 1004 is asserted and a register number for calculation N of the complex instruction is selected in each of the selectors 1006 to 1008. The enable signal on line 931 of the counter 426 is negated. In the next cycle in the counter 926, the counter value on line 932 is cleared by the negating of the enable signal on line 931, based on FIG. 11, and the supply stopping signal on line 905 to the fetch unit 900 and the selector 904 is negated. Since the signal on line 905 is negated, the instruction code on line 901, which has been held for the preceding N–1 cycles, is transmitted to the decoder 907 through the selector 904. Thereby, it is possible to execute a correct next instruction and to continue to process the instructions in a correct order.

Figure 12:
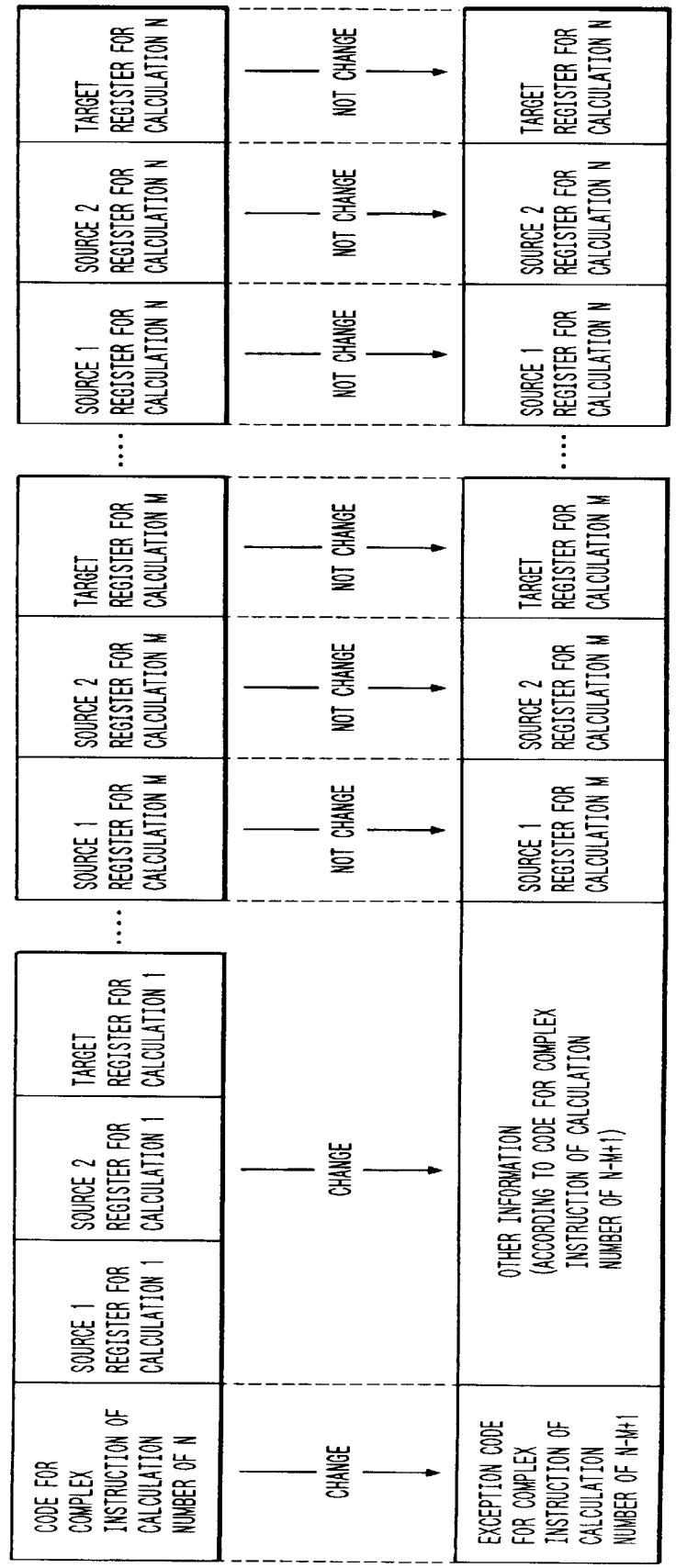
FIG. 12 is a diagram explaining the code changing in a further embodiment according to the present invention.

Description will be made below of the operations of the code changer 923 and the exception register 925 in this embodiment upon occurrence of a calculation exception during processing of a complex instruction The code changer 923 is informed of the progress of processing for a complex instruction on line 906 by referring to the signal on line 927. Therewith, changing is performed for the code of another complex instruction relating to only pseudo-non-processed calculations and the result on line 924 is stored in the exception register 925. FIG. 12 shows an example of a code change in a case of occurrence of an exception in the calculation M (1<M<N).

Figure 13:
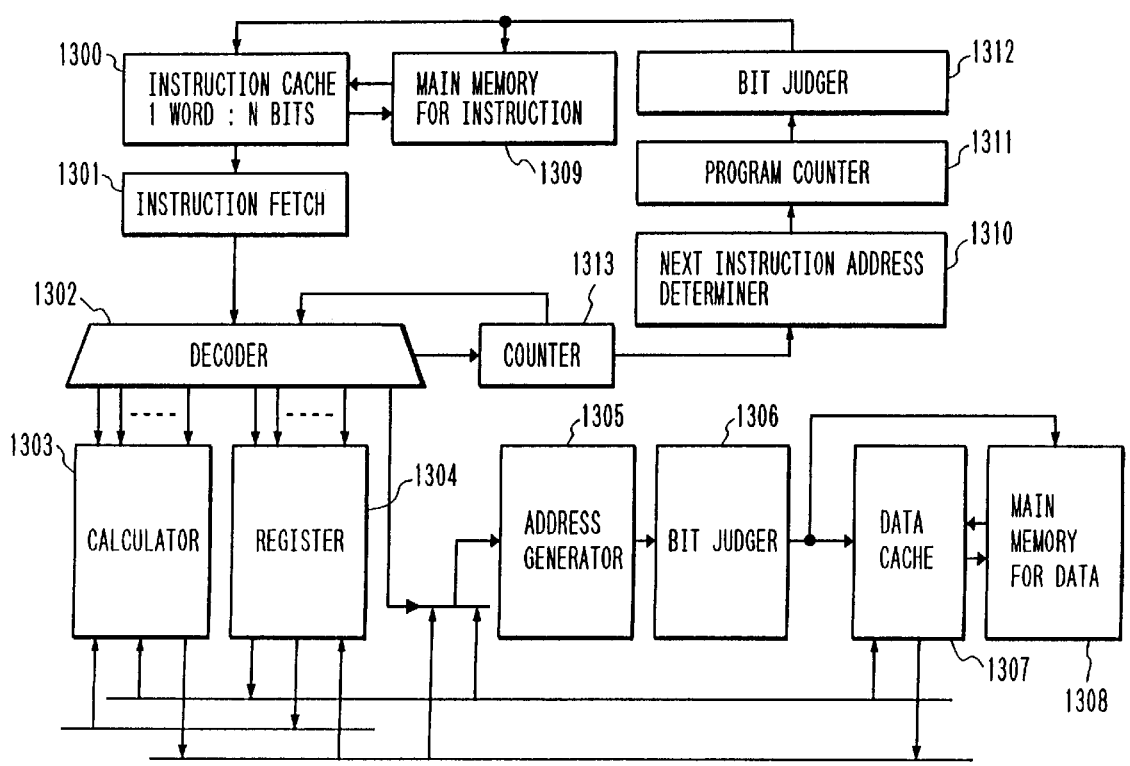
FIG. 13(a) shows a common instruction format in a VLIW.
FIG. 13(b) is a block diagram of an embodiment applying the present invention to a VLIW.

Next, FIG. 13(b) shows an embodiment where the present invention is applied to a processor of the VLIW (very long instruction word) type. In general, a VLIW calls for a calculation, main memory control or branching control with each field in one instruction code, and therefore, a processor processing these operations has a function to execute the instruction at one time. In this embodiment, the instruction is processed by using a counter 1313 instead of providing the function of processing one instruction at a time. An instruction fetch 1301 transmits an instruction code stored in at address indicated by a program counter 1311 from a instruction cache 1300 to a decoder 1302. In the decoder 1302, decoding is successively performed in the order from the field in the left end of the instruction code. The counter indicates the field to be decoded by the decoder. The count value is set to 0 at the beginning of decoding, is increased every time a field is decoded, and is cleared to 0 at the time when all of the fields have been decoded. The counter 1313 controls the stopping of the program counter 1311 by controlling a next instruction address determiner 1310 while the count value is progressing. Since the program counter 1311 indicates the same value to the next instruction address determiner 1310 until all the fields are decoded, the instruction fetch 1301 will output the same instruction code to the decoder 1302. Therewith, an instruction of the VLIW type can be processed without increasing the algorithm for parallel operation of calculators or the number of ports in the registers.

Figure 14:
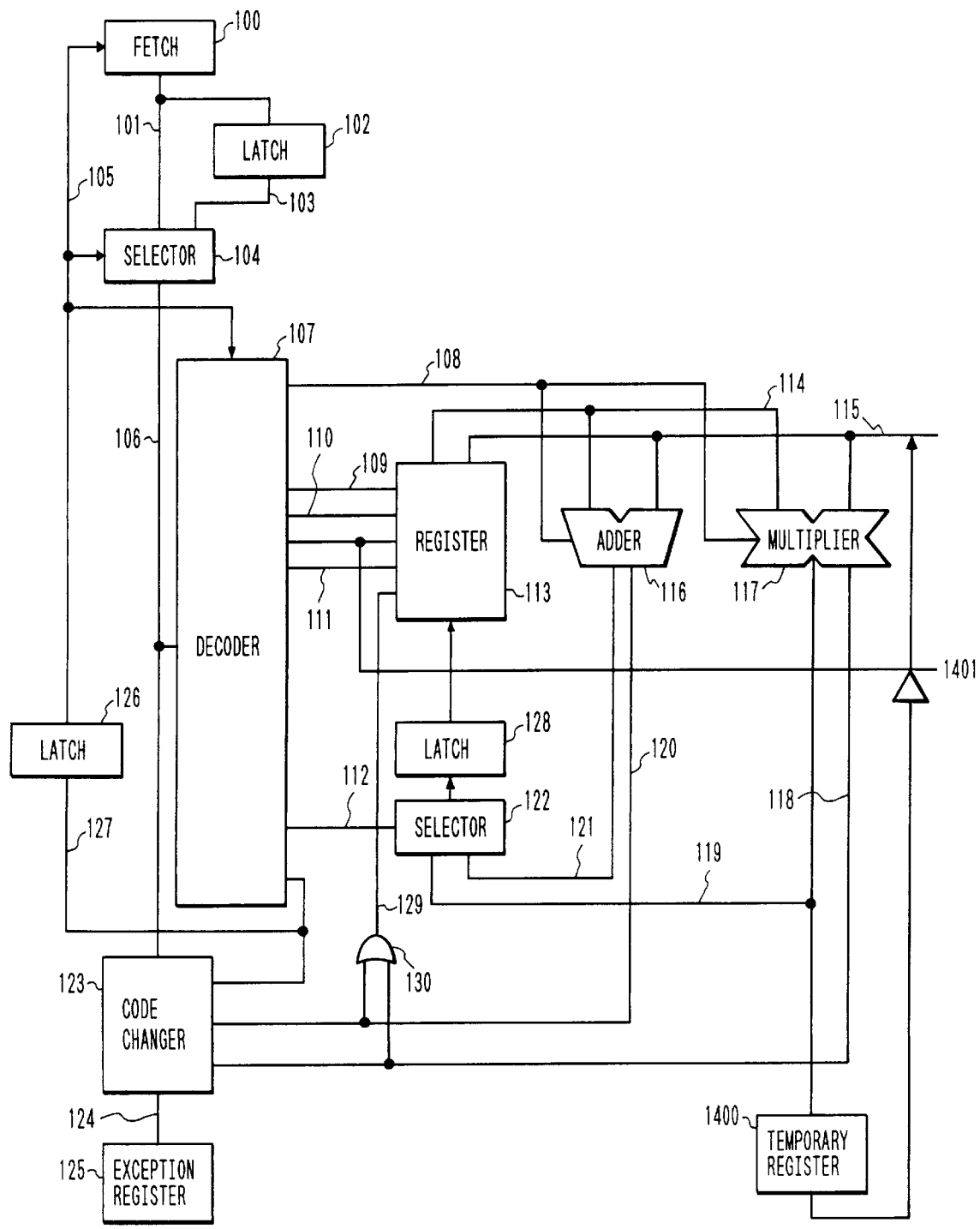
FIG. 14 is a block diagram showing an embodiment according to the present invention adding a processing function of sum-of-product.

Next, FIG. 14 shows an embodiment where a function to process the sum of a product is added to an embodiment to process a complex instruction for carrying out addition and multiplication. An instruction for obtaining the sum of a product is different from a complex instruction to independently process addition and multiplication, in that it is an instruction to add the results of multiplication. In this embodiment, an instruction for obtaining the sum of a product is processed as follows. Since the processing is performed over two cycles similar to the case of a complex instruction, the mechanism to extend the pipe-line follows the embodiment 1. However, since the multiplication in the first cycle is not to be written in a register in this case, a writing inhibition signal 1401 is output.

Figures 16A, 16B:
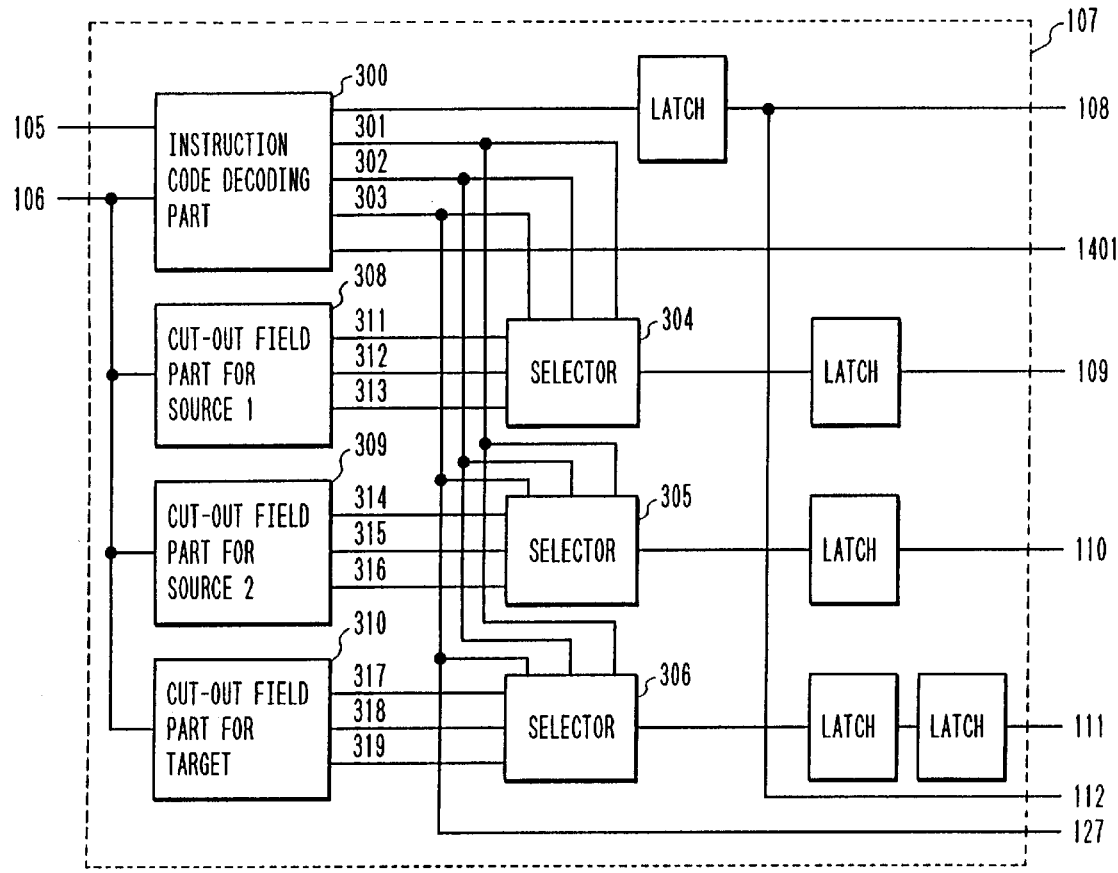
FIG. 16(a) is a block diagram of an embodiment of a decoder adding a sum-of-product instruction function according to the present invention.
FIG. 16(b) is a decoding table.

Instead of the normal writing operation, the multiplication result produced in the first cycle is output to a bus 115 in synchronism with the cycle of reading-out the result of addition in the second cycle through a temporary register. And, since it is sufficient to have one addition source from the register, reading-out i-s inhibited. After completion of the addition, the result is written in the register 13. FIG. 15 shows these timings. FIG. 16(*a*) shows the details of the decoder 107 and FIG. 16(*b*) shows a decoding table. The instruction code decoding part 300 outputs each of the signals according to the decoding table. The signals 109, 110, 111 are contents of fields for source 1, for source 2 and for the target, respectively, and are transmitted to the register 113. The signal 1401 is used for inhibiting writing multiplication of the sum of the product instruction, for inhibiting the reading-out of the addition result, and for output control to the bus.

What is claimed is:

1. A data processor comprising:

a decoder having a detecting part for decoding an instruction and for detecting whether or not the instruction is an instruction for executing a plurality of calculations in one cycle, a field rearranging part for rearranging a part of the fields of said instruction based on a predetermined number of calculations to be processed when it is judged by said detecting part that an instruction is an instruction for executing a plurality of calculations in one cycle, and a calculation control part for performing control to execute the plurality of calculations in plural cycles in synchronism with the order of said rearranged fields; and a calculation part for executing the plurality of calculations in plural cycles based on the control from said calculation control part.

2. A data processor according to claim 1, which further comprises:

an exception register for holding an instruction in which an exception processing occurs and for holding calculated results obtained by an executed calculation processing or calculations not executed when the exception processing occurs in the calculations executed by said calculation part.

3. A data processor according to any one of claim 1 and claim 2, wherein:

said field rearranging part includes means, responsive to occurrence of an exception processing in said calculation part, for changing the instruction code in which the exception processing occurs to an exception processing code to execute exception processing.

4. A data processor according to any one of claim 1 and 2, wherein:

said instruction for executing a plurality of calculations is a VLIW instruction.

5. A data processor according to any one of claim 1 and claim 2, wherein:

said decoder includes means for detecting when the number of calculations required by said instruction is larger than the number of calculations capable of being processed at one time, for outputting the detected result to said field rearranging part to cause said field rearranging part to divide the calculations into plural cycles.

6. A data processor according to any one of claim 1 and 2, wherein:

said calculation part comprises a single calculator.

7. A data processor according to any one of claim 1 and 2, wherein:

said calculation part has a smaller number of calculators than the number of calculations instructed by said instruction.

8. A data processor according to claim 6, wherein:

said calculation part has a plurality of calculators, each executing a different kind of calculation processing.

9. A data processor according to claim 7, wherein:

said calculation part has a plurality of calculators, each executing a different kind of calculation processing.

10. A data processor comprising:

a plurality of calculators, each one of the plurality of calculators executing different processing;

a detecting part which detects whether or not an instruction is an instruction for executing a plurality of calculations in one cycle;

a decoding part which outputs a signal for selecting one of said plurality of calculators to be executed in a time cycle based on an output of said detecting part and a signal outputted in the immediately preceding time cycle; and a selector which selects a register field to be used by said one of said plurality of calculators.

11. A data processor comprising:

a plurality of calculators, each one of the plurality of calculators executing different processing;

a detecting part which detects whether or not an instruction is an instruction for executing a plurality of calculations in one cycle;

a decoding part which outputs a signal for selecting one of said plurality of calculators to be executed in a time cycle based on an output of said detecting part and a signal outputted in the immediately preceding time cycle; and a selector which selects a register field to be used by said one of said plurality of calculators, in which the calculation control part performs control to execute the plurality of calculations in plural cycles in synchronism with the order of the rearranged fields when it is judged by the detecting part that an instruction is an instruction for executing a plurality of calculations in one cycle.

12. A data processor according to claim 11, which further comprises:

an exception register for holding an instruction in which an exception processing occurs and for holding calculated results obtained by an executed calculation processing or calculations not executed when the exception processing occurs in the calculations executed by said calculation part.

13. A data processor according to any one of claim 11 and claim 12, wherein said field rearranging part includes means responsive to occurrence of an exception processing in said calculation part, for changing the instruction code in which the exception processing occurs to an exception processing code to execute exception processing.

14. A data processor according to any one of claim 11 and 12, wherein said instruction for executing a plurality of calculations is a VLIW instruction.

15. A data processor according to any one of claim 11 and claim 12, wherein said decoder includes means for detecting when the number of calculations required by said instruction is larger than the number of calculations capable of being processed at one time, for outputting the detected result to said field rearranging part to cause said field rearranging part to divide the calculations into plural cycles.

16. A data processor according to any one of claim 11 and 12, wherein said calculation part comprises a single calculator.

17. A data processor according to any one of claim 11 and 12, wherein said calculation part has a smaller number of calculators than the number of calculations instructed by said instruction.

18. A data processor according to claim 16, wherein said calculation part has a plurality of calculators, each executing a different kind of calculation processing.

19. A data processor according to claim 17, wherein said calculation part has a plurality of calculators, each executing a different kind of calculation processing.

* * * * *